July 16, 1946.   A. L. CHRISTIANSEN   2,403,910
FLAKING MACHINE FOR FISH AND THE LIKE
Filed March 14, 1939   2 Sheets-Sheet 1
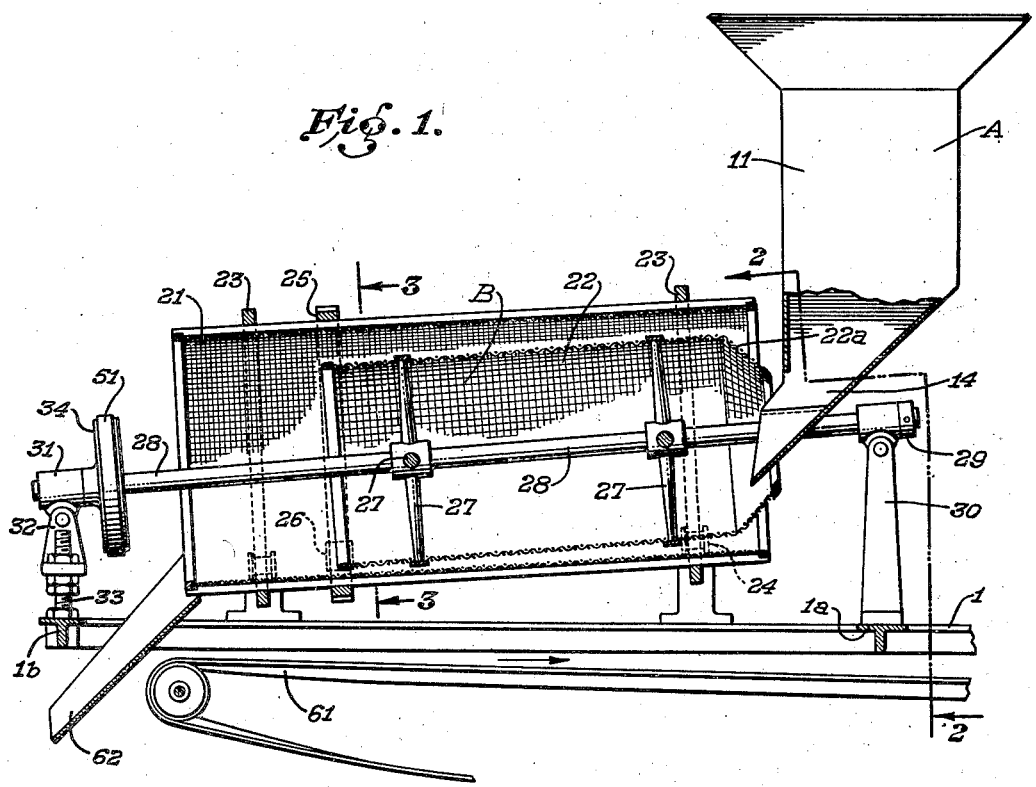
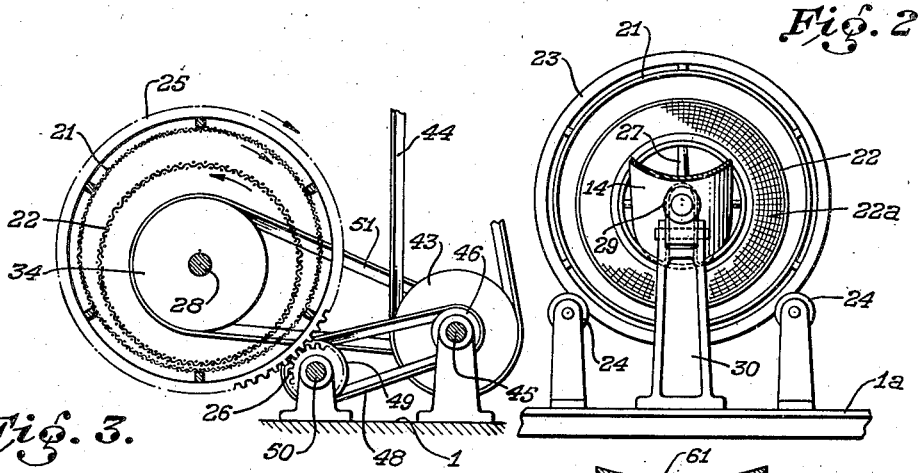
INVENTOR.
Andrew L. Christiansen
BY
*William B. Hall*
ATTORNEY.

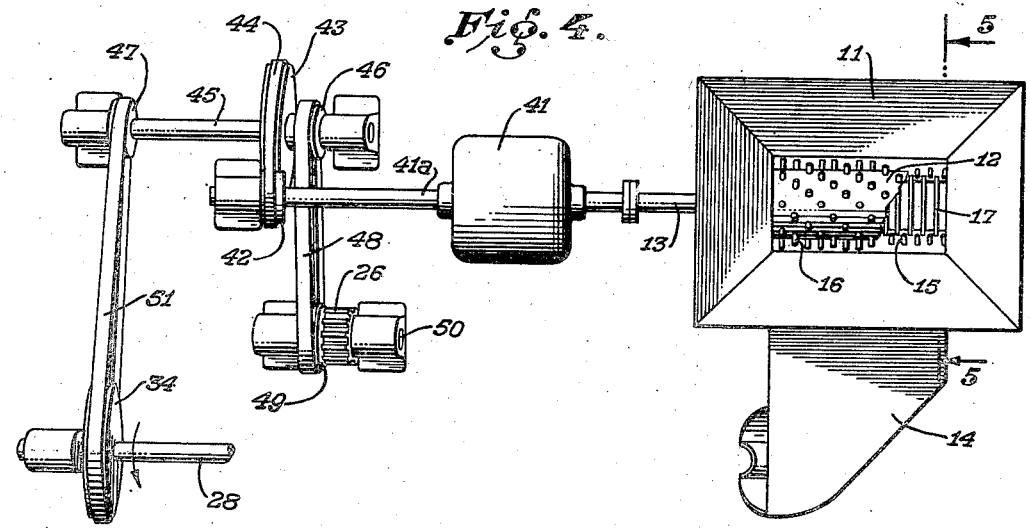
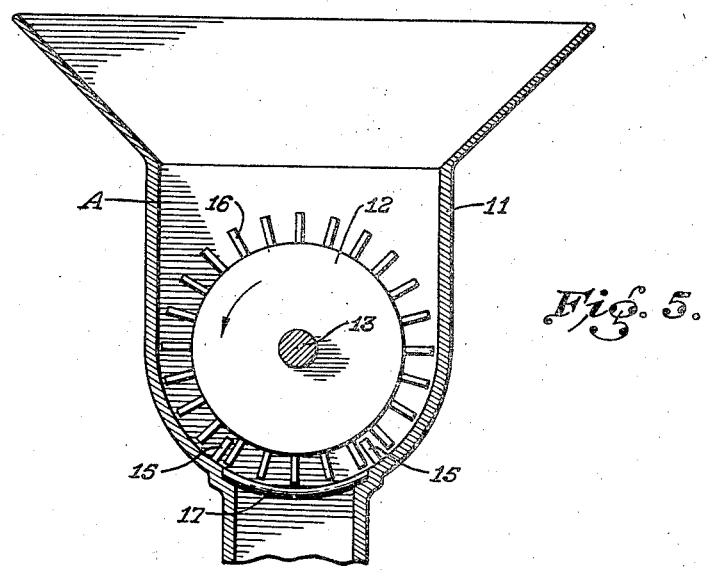

Patented July 16, 1946

2,403,910

UNITED STATES PATENT OFFICE 2,403,910

FLAKING MACHINE FOR FISH AND THE LIKE

Andrew L. Christiansen, Willowbrook, Calif.

Application March 14, 1939, Serial No. 261,744

23 Claims. (Cl. 146—90)

My present invention relates to a machine or apparatus for, and to a method of, dividing a product, particularly such as a fibrous, glutinous or similar food or other product, and particularly for dividing or separating the same into flakes or similarly small pieces.

One of the principal objects of this invention is to provide a machine of this class for making or preparing fish flakes, or finely divided fish, preparatory to canning, or for similarly dividing other food products.

Another important object of this invention is to provide a machine or apparatus of this class which is particularly simple and economical of construction, which is durable, which is simple and economical to operate, and easy to adjust.

An important object of this invention also is the provision of a novel means for dividing or separating the product into flakes or small particles or pieces and simultaneously segregating and removing the larger, undivided and waste portions without additional effort or operation.

Another important object of this invention is to provide novel and simple means of adjusting the machine to vary the capacity, to accommodate various products, and to vary slightly the size of the flakes or divided pieces.

A further object of this invention is to provide a novel combination of elements whereby a partially divided product may be continuously and uniformly supplied to the main product flaking or dividing means.

Still another important object of this invention is to provide a simple and economical method of flaking or dividing fish or other product.

With these and other objects in view, as will appear hereinafter, I have devised a machine for flaking fish, and the like, said machine having certain novel features of construction, combination and arrangement of parts and portions, as will be hereinafter described in detail and particularly set forth in the appended claims, reference being had to the accompanying drawings and to the characters of reference thereon, which form a part of this application and in which:

Fig. 1 is a sectional elevational view of my flaking machine in a preferred form of construction, the section being taken on a vertical through the median portion of the machine;

Fig. 2 is a transverse sectional view thereof taken through 2—2 of Fig. 1, showing the feed ends of the flaking or dividing members;

Fig. 3 is a transverse sectional view, taken through 3—3 of Fig. 1, nearer the discharge end of the flaking or dividing members;

Fig. 4 is a plan view showing principally the driving mechanism for the several units; and, Fig. 5 is a transverse sectional elevation through 5—5 of Fig. 4, showing the initial dividing or grinding unit.

The machine, shown in the drawings and consisting primarily of the initial divider or grinder A and the main divider or flaker B, is supported on a frame 1.

The grinder A, which is mounted at one end and one side of the frame, comprises a housing 11, in which is rotatably mounted a rotor 12. This rotor is mounted on a shaft 13 extending longitudinally through the housing. At the bottom of the housing is a discharge chute 14, and at each of the opposite sides thereof is a grating consisting of a row of spaced upwardly extending prongs 15. The drum 12 is provided with circumferentially arranged transverse rows of spaced radiating spurs or teeth 16, spaced so as to pass between the spaced prongs 15. Over the discharge opening at the bottom of the housing 11 may be a grating 17 consisting of bars spaced similarly to the prongs and spurs.

Thus when a fish or similar product is placed into the grinder and the rotor 12 rotated, the fish, or other product, is first divided when coming in contact with the first row of prongs 15. If the pieces do not drop through the grating 17, they are carried by teeth or spurs of the rotor and are further divided or ground by being forced into contact with the second row of prongs. This process is repeated until all of the particles fall into the chute 14.

The main dividing unit B of my machine consists of abrasive members for scouring, tearing, or further finally dividing the fish. This abrasive unit or these abrasive members consist of a pair of foraminous members in the form of drums, which, in the drawings, are illustrated as screen cylinders 21 and 22, the latter being considerably smaller in diameter and in length than the former, with their feed ends substantially coincident. These members, drums, or screens are separately supported and inclined downwardly from said feed ends.

The drum 21 is provided near and around its opposite ends with annular tracks 23 which are supported in flanged rollers 24. This drum 21 also has, intermediate its ends, a ring gear 25 driven, in the direction of the arrow, by a pinion 26.

The foraminous drum or screen 22 is supported by a pair of spaced spiders 27 on a shaft 28. The shaft extends beyond the feed end of the drum 22 and is journaled in a bearing 29 which is pivoted on a bracket 30 supported on a cross member 1ª of the frame 1.

The other end of the shaft 28 extends beyond the discharge end of the drum 21 and is journaled in a bearing 31 which is pivoted in an adjustable bracket 32. This bracket may be raised and lowered on screws 33 extending upwardly from a cross member 1ᵇ at the opposite end of the frame 1. This shaft is rotated by a sheave or other member 34.

The vertical adjustment of the bearing 32 causes the lower portions of the ends of the two drums nearest the bearing to be adjusted either closer together or separated in a vertical direction. Such adjustment varies the inclination of elements or elemental portion of the lower or adjacent portions of the cylindrical screen or foraminous drums, so that these elemental portions converge toward the lower ends of the foraminous drums or members.

The openings or meshes in the drum or cylinder 22 are considerably larger than those in the drum or cylindrical screen 21, and these drums or screens are rotated in opposite direction, as indicated by the arrows, and as will be presently explained.

The chute 14 from the divider or grinder A is directed or discharged into the feed end of the drum or cylinder 22. In order to prevent the product from the grinder A from discharging beyond the feed end of the drum 22, the latter end of the drum converges slightly, as shown at 22ª.

The operating power of my machine may be supplied by a motor 41, which may be supported on the frame 1. The shaft 41ª of the motor is shown as connected directly to the shaft 13 of the grinder. On the shaft 41ª of the motor is a sheave 42 which is shown connected to a large sheave 43 by means of a belt 44. This sheave 43 is mounted on a shaft 45 having small sheaves 46 and 47 mounted thereon. The sheave 46 is connected, by a belt 48, to a sheave 49 mounted on a shaft 50 upon which the pinion 26 is mounted. The sheave 47 is connected, by a belt 51, to the sheave 34 on the shaft 28 carrying the smaller drum or screen.

It will be noted that the axis of the shaft 50 may be at a slight angle to the axis of the motor 41. The angularity of the axis of the shaft 28 may vary constantly. For these reasons, I have shown belt connections between the motor 41 and the drives for the drums 21 and 22. This structure, however, is to be understood as not confined to such drives.

As a partly divided or ground fish, or other product, is discharged into the feed end of the drum 22, the product gradually drops through the openings of this drum into the drum 21, the openings or meshes of which are smaller. The lower end of the drum 22 is adjusted to the desired spaced position from the drum 21. Since both drums are inclined, the product is fed gradually toward the end of the drum 22. Such feeding of the product causes the same to be slightly compressed, and as the drums rotate in opposite directions, the product is further broken up or divided and gradually forced through the smaller openings in the drum 21. The drums are adjusted to such a position relative to each other that all of the desired product is forced through the drum 21. The remaining product, which is substantially waste substance, such as, bones, fins, scales, skin, fibres, of the fish or other product which may be treated by the machine, is discharged from the end of the drum 22 into the drum 21, and then from the end of the latter drum.

The divided product, which is known as flakes (if fish are treated), drops onto a conveyor 61. The waste product is discharged from the lower end of the drum 21 onto a chute 62.

Though I have shown and described a particular construction, combination, and arrangement of parts and portions of my machine, and a certain method of treating, dividing, or flaking fish, or other product, I do not wish to be limited to the same, but desire to include in the scope of invention the construction, combination, arrangement, and method substantially as set forth in the appended claims.

I claim:

1. In a machine of the class described, a pair of drums, one of the drums being foraminous and one positioned within and rotatable relative to the other, the lower elemental portion of both drums being inclined downwardly toward one end, said lower portions being transversely adjustable relative to each other to vary their relative angular inclination.

2. In a machine of the class described, a pair of rotatable foraminous drums, one positioned within and rotatable relative to the other, the lower elemental portion of both drums being inclined downwardly toward one end, said lower portions being transversely adjustable relative to each other to vary their relative angular inclination.

3. In a machine of the class described, a pair of closely positioned mutually abrasive members, one of said members being foraminous, said members being inclined downwardly toward one end, and movable laterally with respect to each other, and means for adjusting said members substantially vertically with respect to each other so as to vary the angular inclination of the members relative to each other.

4. In a machine of the class described, a pair of closely positioned mutually abrasive members, said members being inclined downwardly toward one end, and movable laterally with respect to each other, and means for adjusting said members substantially vertically with respect to each other so as to vary the angular inclination of the members relative to each other, the lower member being foraminous.

5. In a machine of the class described, a grinder for breaking up a product, to be treated, into a divided state, a pair of separating members having vertically spaced abrasive separating portions, said portions being movable laterally with respect to each other, the upper abrasive separating portion being foraminous and capable of receiving thereon the divided product of the grinder, said portions being positioned closer together than the normal size of the divided product from the grinder.

6. In a machine of the class described, a grinder for breaking up a product, to be treated, into a divided state, and a pair of separating members having vertically spaced foraminous abrasive separating portions, said portions being movable laterally with respect to each other, the upper abrasive separating portion being capable of receiving thereon the divided product of the grinder, said portions being positioned closer together than the normal size of said divided product from the grinder.

7. In a machine of the class described, a grinder for breaking up a product, to be treated, into a divided state, a pair of separating members having vertically spaced abrasive separating portions, said portions being movable laterally with respect to each other, the upper abrasive separating portion being foraminous and capable of receiving near one end thereon the divided product of the grinder, said portions converging from the receiving to the opposite end, the portion adjacent the latter end being positioned closer together than the normal size of the divided product from the grinder, and means for adjusting the spacing between the latter end of said portions.

8. In a machine of the class described, a grinder for breaking up a product, to be treated, into a divided state, a pair of separating members having vertically spaced foraminous abrasive separating portions, said portions being movable laterally with respect to each other, the upper abrasive separating portion being capable of receiving near one end thereon the divided product of the grinder, said portions converging from the receiving to the opposite end, the portion adjacent the latter end being positioned closer together than the normal size of said divided product from the grinder, and means for adjusting the spacing between the latter end of said portions.

9. In a machine of the class described, a grinder for breaking up a product, to be treated, into a divided state, and a pair of separating members having vertically spaced foraminous abrasive separating portions, said portions being movable laterally with respect to each other, the upper abrasive separating portion receiving near one end thereon the divided product of the grinder and provided with larger openings than the lower abrasive separating portion for allowing said product to pass between said portions in regulated quantities, said portions converging from the receiving to the opposite ends, the portion adjacent the latter end being positioned closer together than the normal size of said divided product from the grinder for dividing the product so as to pass through the openings of the said lower portion.

10. In a machine of the class described, a grinder for breaking up a product, to be treated, into a divided state, and a pair of spaced abrasive separating members movable laterally with respect to each other, one of said members being foraminous and capable of receiving at the side thereof opposite the space between said abrasive separating members the product from the grinder, said members being positioned closer together than the normal size of said divided product from the grinder.

11. In a machine of the class described, a grinder for breaking up a product, to be treated, into a divided state, and a pair of spaced foraminous abrasive separating members movable laterally with respect to each other, the divided product from the grinder being directed toward the outer side of one of said foraminous separating members, said members being positioned closer together than the normal size of said divided product from the grinder.

12. In a machine of the class described, a grinder for breaking up a product, to be treated, into a divided state, a pair of spaced abrasive separating members movable laterally with respect to each other, one of said members being foraminous and capable of receiving at the side thereof opposite the space between said abrasive separating members and at one end thereof the divided product of the grinder, said members converging from the receiving to the opposite end, the portions adjacent the latter ends being positioned closer together than the normal size of the divided product from the grinder, and means for adjusting the spacing between the latter ends of said members.

13. In a machine of the class described, a grinder for breaking up a product, to be treated, into a divided state, a pair of spaced foraminous abrasive separating members movable laterally with respect to each other, the divided product from the grinder being directed toward the outer side near one end of one of said foraminous separating members, said members converging from the receiving to the opposite ends, the portions adjacent the latter end being positioned closer together than the normal size of said divided product from the grinder, and means for adjusting the spacing between the latter end of said members.

14. In a machine of the class described, a grinder for breaking up a product, to be treated, into a divided state, and a pair of spaced foraminous abrasive separating members movable laterally with respect to each other, the product from the grinder being directed toward the outer side near one end of one of said foraminous separating members, the latter member being provided with larger openings than the other member for allowing said product to pass through said members in regulated quantities, said members converging from the receiving to the opposite ends, the portions adjacent the latter ends being positioned closer together than the normal size of said divided product from the grinder for dividing the product so as to pass through the openings of said other member.

15. The herein described process of mechanically dividing fish, consisting in simultaneously applying compressing and active abrasive dividing forces is relative opposite lateral directions to opposite sides of a relatively thin layer of the fish and continuously removing a divided and separated portion from one side of said layer of fish.

16. The herein described process of mechanically dividing a product, consisting in simultaneously applying compressing and abrasive dividing forces in relative opposite lateral directions to opposite sides of a relatively thin layer of the product and continuously removing a divided and separated portion from one side of said layer of the product, and continuously distributing fresh partially divided product to the opposite side of the layer.

17. The herein described process of mechanically dividing fish, consisting in feeding the fish to a gradually diminishing space thereby compressing it to a thin layer, simultaneously applying opposed abrasive forces to the opposite sides of the layer, thereby dividing the fish, then gradually and continuously removing a portion of the divided fish.

18. The herein described process of mechanically dividing fish, consisting in directing a layer of fish in a downward path, and simultaneously applying a compressing force to the layer and relative opposing abrasive forces to the opposite sides thereof.

19. The herein described process of mechanically dividing fish, consisting in directing a layer of fish in a downward path, simultaneously applying a compressing force to the layer, and relative and opposing abrasive forces to the opposite sides thereof, and continuously removing a divided and separated portion from one side of said layer of the fish.

20. In a machine of the class described, a pair of closely positioned members spaced from and movable laterally with respect to each other, one of said members being foraminous, said members being adapted to receive a product therebetween, both of said members being capable of simultaneously operating on said product, and means for adjusting one of the corresponding ends of said members with respect to each other and in a direction substantially at right angles to the direction of the first mentioned relative movement of said members, so as to vary the angular inclination of the members relative to each other.

21. In a machine of the class described, a pair of closely positioned foraminous members spaced from and movable laterally with respect to each other, said members being adapted to receive a product therebetween, both of said members having means for simultaneously operating on said product, and means for adjusting one of the corresponding ends of said members with respect to each other and in a direction substantially at right angles to the direction of the first mentioned relative movement of said members, so as to vary the angular inclination of the members relative to each other.

22. In a machine of the class described, a pair of closely positioned members, one of said members being foraminous, said members being inclined downwardly and converging toward one end, said members being movable laterally with respect to each other, said members being adapted to receive a product therebetween, both of said members being capable of simultaneously operating on said product, said members being also adjustable vertically with respect to each other to vary their relative angular inclination.

23. In a machine of the class described, a pair of closely positioned foraminous members, said members being inclined downwardly and converging toward one end, said members being movable laterally with respect to each other, said members being adapted to receive a product therebetween, both of said members having means for simultaneously operating on said product, said members being also adjustable vertically with respect to each other to vary their relative angular inclination.

ANDREW L. CHRISTIANSEN.